United States Patent
Yamaguchi et al.

(10) Patent No.: US 8,888,906 B2
(45) Date of Patent: Nov. 18, 2014

(54) HEAT-SENSITIVE COLOR-DEVELOPING COMPOSITION AND HEAT-SENSITIVE RECORDING MATERIAL COMPRISING THE COMPOSITION

(75) Inventors: Ryoji Yamaguchi, Yao (JP); Toshihiro Masaoka, Yao (JP); Keisuke Takuma, Yao (JP)

(73) Assignee: Yamamoto Chemicals, Inc., Osaka (JP)

( * ) Notice: Subject to any disclaimer, the term of this patent is extended or adjusted under 35 U.S.C. 154(b) by 57 days.

(21) Appl. No.: 13/823,817

(22) PCT Filed: Sep. 13, 2011

(86) PCT No.: PCT/JP2011/070794
§ 371 (c)(1),
(2), (4) Date: Mar. 15, 2013

(87) PCT Pub. No.: WO2012/036144
PCT Pub. Date: Mar. 22, 2012

(65) Prior Publication Data
US 2013/0180430 A1    Jul. 18, 2013

(30) Foreign Application Priority Data
Sep. 17, 2010  (JP) .................................. 2010-209401

(51) Int. Cl.
| | | |
|---|---|---|
| *C09D 11/00* | (2014.01) | |
| *B41M 5/323* | (2006.01) | |
| *B41M 5/333* | (2006.01) | |
| *C09D 5/26* | (2006.01) | |

(52) U.S. Cl.
CPC .............. *C09D 5/26* (2013.01); *B41M 5/323* (2013.01); *B41M 5/3333* (2013.01)
USPC ............... 106/31.16; 106/31.18; 106/31.19; 106/31.21; 503/216; 503/217; 503/219

(58) Field of Classification Search
USPC ............ 106/31.16, 31.18, 31.19, 31.21; 503/216, 217, 219
See application file for complete search history.

(56) References Cited

U.S. PATENT DOCUMENTS

| | | | | |
|---|---|---|---|---|
| 3,907,567 | A * | 9/1975 | Nihyakumen et al. | 106/31.18 |
| 4,200,667 | A * | 4/1980 | Lee et al. | 106/31.16 |
| 4,425,161 | A * | 1/1984 | Shibahashi et al. | 106/31.17 |
| 4,745,046 | A * | 5/1988 | Borror et al. | 503/217 |
| 5,489,501 | A | 2/1996 | Torii et al. | |
| 2008/0022888 | A1* | 1/2008 | Arndt | 106/31.16 |

FOREIGN PATENT DOCUMENTS

| | | |
|---|---|---|
| JP | 2-270592 A | 11/1990 |
| JP | 7-228045 A | 8/1995 |
| JP | 8-230327 A | 9/1996 |

OTHER PUBLICATIONS

International Search Report issued in PCT/JP2011/070794, dated Nov. 29, 2011.

* cited by examiner

*Primary Examiner* — Helene Klemanski
(74) *Attorney, Agent, or Firm* — Birch Stewart Kolasch & Birch, LLP

(57) ABSTRACT

A heat-sensitive color-developing composition containing a hydroxyquinoline compound having a methyl group and an acid anhydride compound represented by general formula (1):

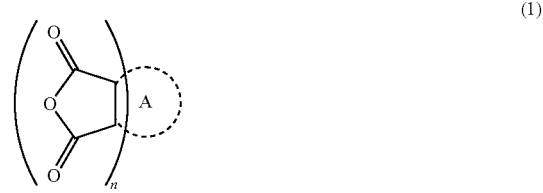

(1)

wherein ring A represents a substituted or unsubstituted aromatic hydrocarbon ring, and n represents an integer of 1 to 3, and a heat-sensitive recording material containing the composition in a recording layer.

6 Claims, No Drawings

HEAT-SENSITIVE COLOR-DEVELOPING COMPOSITION AND HEAT-SENSITIVE RECORDING MATERIAL COMPRISING THE COMPOSITION

TECHNICAL FIELD

The present invention relates to a heat-sensitive color-developing composition which forms a developed color body having high fastness and a vivid hue. The present invention also relates to a heat-sensitive recording material containing the composition.

BACKGROUND ART

Conventionally, when coloring an object such as paper, a plastic, cloth, a can, and a bottle, there has generally been employed a method in which an ink, Japanese ink, a coating, or the like each having a color is applied to the object and adheres thereto by the evaporation of a solvent to obtain a colored material. However, in recent years, as a result of the need for a system which can immediately respond to any character, view, and pattern, a heat-sensitive recording material in which a layer having color-developing ability (hereinafter, referred to as a recording layer) is previously applied to the whole surface has been developed. In the system using this recording material, an electric signal is converted into heat by a thermal head, and various characters and patterns are immediately revealed and recorded. Since a vivid developed color image is easily obtained with a simple apparatus, this recording material has been widely put to practical use as a facsimile paper, a word processor paper, a chart of various analytical instruments, a ticket, a commuter pass, a prepaid card, a tag, and the like.

Generally, a system using an electron-donative dye (a phthalide or a fluoran leuco dye) as a color coupler and an electron-acceptive phenol compound as a color developer is well known as a recording layer of the heat-sensitive recording material (Patent Literature 1). However, since a reversible reaction is used in this system, the natural discoloration of a developed color image and the decolorization by a plasticizer, an oil, water, heat, light, and the like may easily occur, and, therefore, it has a problem that the storage stability of the developed color image is poor.

In order to overcome this disadvantage, various compounds have been studied, and an attempt utilizing a phthalocyanine compound having high fastness has also been proposed. This is a method of containing a precursor of a phthalocyanine compound in a recording layer and heating the precursor to form a phthalocyanine compound as a developed color image. For example, there has been proposed a method of using 1-amino-3-imino-isoindolenine or a derivative thereof and an organic acid metal salt or metal complex salt compound for a recording layer (Patent Literature 2). Furthermore, there has been proposed a heat-sensitive recording material in which an imino compound such as 1,3-diiminoisoindoline is carried (Patent Literature 3). However, in any of the cases, the hue of the developed color images was not vivid, and it was difficult to actually use these materials as a heat-sensitive recording material.

Furthermore, there has also been proposed methods of using a heat-sensitive recording material in which an irreversible developed color body obtained by a heat-melting reaction of an aromatic isocyanate with an imino compound is used as a recording image (Patent Literatures 4 and 5), but these methods had a disadvantage that the storage stability of the developed color image was poor.

For such reasons, there has been required a heat-sensitive recording material which solves the conventional problems and satisfies high fastness and a vivid hue at the same time.

CITATION LIST

Patent Literature

[Patent Literature 1]
  Japanese Patent Publication No. 45-14039
[Patent Literature 2]
  Japanese Patent Publication No. 58-8357
[Patent Literature 3]
  Japanese Patent Publication No. 04-16353
[Patent Literature 4]
  Japanese Patent Laid-Open No. 59-115887
[Patent Literature 5]
  Japanese Patent Laid-Open No. 02-103180

SUMMARY OF THE INVENTION

Technical Problem

An object of the present invention is to provide a heat-sensitive color-developing composition for forming a developed color body having high fastness and a vivid hue, and a heat-sensitive recording material comprising the composition.

Solution to Problem

As a result of intensive studies on the above object, the present inventors have found that the object can be solved by using a hydroxyquinoline compound having a specific structure and an acid anhydride compound having a specific structure, and the present invention has been completed based on this finding. Specifically, the present invention relates to:

(i) A heat-sensitive color-developing composition containing a hydroxyquinoline compound having a methyl group and an acid anhydride compound represented by general formula (1):

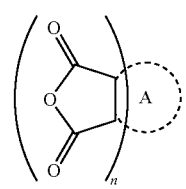

(1)

wherein ring A represents a substituted or unsubstituted aromatic hydrocarbon ring, and n represents an integer of 1 to 3;

(ii) The heat-sensitive color-developing composition according to (i) above, wherein the hydroxyquinoline compound having a methyl group is a compound represented by general formula (2):

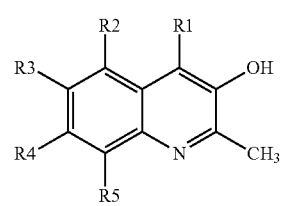

(2)

wherein R1 to R5 each independently represent a hydrogen atom, a halogen atom, a substituted or unsubstituted alkyl group, a substituted or unsubstituted alkoxy group, a substituted or unsubstituted alkylthio group, a substituted or unsubstituted alkenyl group, a substituted or unsubstituted alkynyl group, a substituted or unsubstituted aryl group, a substituted or unsubstituted aralkyl group, a substituted or unsubstituted aryloxy group, or a substituted or unsubstituted arylthio group;

or adjacent groups selected from R2 to R5 may be combined with each other and thus, together with the carbon atoms to which they are attached, to form a substituted or unsubstituted 5 or more-membered ring;

(iii) The heat-sensitive color-developing composition according to (i), wherein ring A in formula (1) is a substituted or unsubstituted benzene ring, a substituted or unsubstituted naphthalene ring, a substituted or unsubstituted anthracene ring, a substituted or unsubstituted phenanthrene ring, a substituted or unsubstituted fluorene ring, a substituted or unsubstituted acenaphthene ring, a substituted or unsubstituted indene ring, a substituted or unsubstituted pyrene ring, a substituted or unsubstituted perylene ring, a substituted or unsubstituted fluoranthene ring, or a substituted or unsubstituted anthraquinone ring;

(iv) The heat-sensitive color-developing composition according to (ii), wherein, in formula (2), R1 to R5 each independently represent a hydrogen atom, a halogen atom, a substituted or unsubstituted alkyl group having 1 to 20 carbon atoms, a substituted or unsubstituted alkoxy group having 1 to 20 carbon atoms, a substituted or unsubstituted alkylthio group having 1 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 30 carbon atoms, a substituted or unsubstituted aralkyl group having 7 to 30 carbon atoms, a substituted or unsubstituted aryloxy group having 3 to 30 carbon atoms, or a substituted or unsubstituted arylthio group having 3 to 30 carbon atoms;

or adjacent groups selected from R2 to R5 may be combined with each other and thus, together with the carbon atoms to which they are attached, to form an unsubstituted benzene or naphthalene ring, or a benzene or naphthalene ring having a substituent(s) which may each independently be, a halogen atom, a substituted or unsubstituted alkyl group having 1 to 10 carbon atoms, a substituted or unsubstituted alkoxy group having 1 to 10 carbon atoms, a substituted or unsubstituted alkylthio group having 1 to 10 carbon atoms, a substituted or unsubstituted aryl group having 6 to 18 carbon atoms, or a substituted or unsubstituted aryloxy group having 6 to 18 carbon atoms; and (v) The heat-sensitive color-developing composition according to (i), wherein ring A in formula (1) is a benzene ring, a naphthalene ring, an anthracene ring, a phenanthrene ring, a fluorene ring, an acenaphthene ring, an indene ring, a pyrene ring, a perylene ring, a fluoranthene ring, or an anthraquinone ring, which is unsubstituted; or a benzene ring, a naphthalene ring, an anthracene ring, a phenanthrene ring, a fluorene ring, an acenaphthene ring, an indene ring, a pyrene ring, a perylene ring, a fluoranthene ring, or an anthraquinone ring, having a substituent(s) which may each independently be a halogen atom, a substituted or unsubstituted alkyl group having 1 to 20 carbon atoms, a substituted or unsubstituted alkoxy group having 1 to 20 carbon atoms, a substituted or unsubstituted alkylthio group having 1 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 30 carbon atoms, a substituted or unsubstituted aralkyl group having 7 to 30 carbon atoms, a substituted or unsubstituted aryloxy group having 3 to 30 carbon atoms, or a substituted or unsubstituted arylthio group having 3 to 30 carbon atoms; and the present invention also relates to:

(vi) A heat-sensitive recording material comprising a support and a recording layer carried on the support, the recording layer containing any of the heat-sensitive color-developing compositions according to the above (i) to (v).

Advantageous Effect of the Invention

Thus, the present invention has made it possible to provide a heat-sensitive recording material which satisfies high density color development and storage stability of a developed color image at the same time.

DESCRIPTION OF EMBODIMENTS

Hereinafter, the present invention will be described in detail.

The present invention is based on the fact that a composition containing a hydroxyquinoline compound having a methyl group (hereinafter abbreviated as component Q, meaning a developed color body-forming component Q) and an acid anhydride compound represented by general formula (1) (hereinafter abbreviated as component P, meaning a developed color body-forming component P) develops color at high density by the application of thermal energy.

<Component Q>

The component Q used in the present invention is a hydroxyquinoline compound having a methyl group, and is preferably a compound in which a carbon atom adjacent to the carbon atom substituted with a methyl group is substituted with a hydroxy group, more preferably a 2-methyl-3-hydroxyquinoline derivative represented by general formula (2):

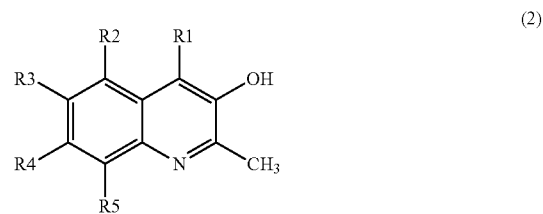

(2)

wherein R1 to R5 each independently represent a hydrogen atom, a halogen atom, a substituted or unsubstituted alkyl group, a substituted or unsubstituted alkoxy group, a substituted or unsubstituted alkylthio group, a substituted or unsubstituted alkenyl group, a substituted or unsubstituted alkynyl group, a substituted or unsubstituted aryl group, a substituted or unsubstituted aralkyl group, a substituted or unsubstituted aryloxy group, or a substituted or unsubstituted arylthio group;

or adjacent groups selected from R2 to R5 may be combined with each other and thus, together with the carbon atoms to which they are attached, to form a substituted or unsubstituted 5 or more-membered ring.

In general formula (2), R1 to R5 each preferably independently represent a hydrogen atom, a halogen atom, a substituted or unsubstituted alkyl group having 1 to 20 carbon atoms, a substituted or unsubstituted alkoxy group having 1 to 20 carbon atoms, a substituted or unsubstituted alkylthio group having 1 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 30 carbon atoms, a substituted or unsubstituted aralkyl group having 7 to 30 carbon atoms, a substituted or unsubstituted aryloxy group having 3 to 30 carbon atoms, or a substituted or unsubstituted arylthio group having 3 to 30 carbon atoms.

More preferably, R1 to R5 each independently represent a hydrogen atom, a halogen atom, a substituted or unsubstituted alkyl group having 1 to 10 carbon atoms, a substituted or unsubstituted alkoxy group having 1 to 10 carbon atoms, a substituted or unsubstituted alkylthio group having 1 to 10 carbon atoms, a substituted or unsubstituted alkenyl group having 2 to 10 carbon atoms, a substituted or unsubstituted alkynyl group having 2 to 10 carbon atoms, a substituted or unsubstituted aryl group having 6 to 25 carbon atoms, a substituted or unsubstituted aralkyl group having 7 to 25 carbon atoms, a substituted or unsubstituted aryloxy group having 3 to 25 carbon atoms, or a substituted or unsubstituted arylthio group having 3 to 25 carbon atoms.

Further preferably, R1 to R5 each independently represent a hydrogen atom, a halogen atom, a substituted or unsubstituted alkyl group having 1 to 10 carbon atoms, a substituted or unsubstituted alkoxy group having 1 to 10 carbon atoms, a substituted or unsubstituted alkylthio group having 1 to 10 carbon atoms, or a substituted or unsubstituted aryl group having 6 to 20 carbon atoms.

Specific examples of R1 to R5 in general formula (2) will be shown below.

Examples of the halogen atom include a fluorine atom, a chlorine atom, a bromine atom, and an iodine atom.

Examples of the unsubstituted alkyl group include linear, branched, and cyclic alkyl groups such as a methyl group, an ethyl group, a n-propyl group, an isopropyl group, a n-butyl group, an isobutyl group, a sec-butyl group, a tert-butyl group, a n-pentyl, an isopentyl group, a neopentyl group, a tert-pentyl group, a n-hexyl group, a 1-methylpentyl group, a 4-methyl-2-pentyl group, a 2-ethylbutyl group, a n-heptyl group, a 1-methylhexyl group, a n-octyl group, a 1-methylheptyl group, a 2-ethylhexyl group, a n-decyl group, n-dodecyl group, a cyclopentyl group, and a cyclohexyl group.

Furthermore, specific examples of the substituted alkyl group include an alkyl group having an alkoxy group or an alkenyloxy group such as a methoxymethyl group, a methoxyethyl group, an ethoxymethyl group, an ethoxyethyl group, a n-butoxymethyl group, a n-butoxyethyl group, a n-hexyloxymethyl group, a (2-ethylbutyloxy)methyl group, a 2-(4'-pentenyloxy)ethyl group, and an ethoxypropyl group; an alkyl group having an aralkyloxy group such as a benzyloxymethyl group, a 4-methylbenzyloxymethyl group, a 3-chlorobenzyloxymethyl group, and a 2-(benzyloxymethoxy)ethyl group; an alkyl group having an aryloxy group such as a phenyloxymethyl group, a 4-chlorophenyloxymethyl group, and a 4-(2'-phenyloxyethoxy)butyl group; an alkyl group having a thioalkyl group such as a n-butylthiomethyl group, a methylthioethyl group, and a 2-n-octylthioethyl group; and an alkyl group having a halogen atom such as a fluoromethyl group, a trifluoromethyl group, a perfluoroethyl group, 4-fluorocyclohexyl group, a dichloromethyl group, a 4-chlorocyclohexyl group, and a 7-chloroheptyl group.

The substituted or unsubstituted alkoxy group is an alkoxy group which may have the same substituent as in the case of the alkyl group as described above, and examples thereof include alkoxy groups derived from the alkyl groups shown as specific examples of the alkyl group as described above.

The substituted or unsubstituted alkylthio group is an alkylthio group which may have the same substituent as in the case of the alkyl group as described above, and examples thereof include alkylthio groups derived from the alkyl groups shown as specific examples of the alkyl group as described above.

Examples of the substituted or unsubstituted alkenyl group include a vinyl group, a propenyl group, a 1-butenyl group, an isobutenyl group, a 1-pentenyl group, a 2-pentenyl group, a 2-methyl-1-butenyl group, a 2-cyclopentenyl group, a 1-vinylhexyl group, a styryl group, a styrylmethyl group, and 2-styrylethyl group.

Examples of the substituted or unsubstituted alkynyl group include an acetylenyl group, a propynyl group, a 1-butynyl group, a 1-pentynyl group, a 2-pentynyl group, a 2-methyl-1-pentynyl group, and a phenylacetylenyl group.

Examples of the substituted or unsubstituted aryl group include an unsubstituted aryl group such as a phenyl group, a 1-naphthyl group, a 2-naphthyl group, a 2-anthracenyl group, a 1-phenanthryl group, a 2-phenanthryl group; a 3-phenanthryl group, a 1-pyrenyl group, a 2-pyrenyl group, a 2-perylenyl group, a 3-perylenyl group, a 2-fluoranthenyl group, a 3-fluoranthenyl group, a 7-fluoranthenyl group, and an 8-fluoranthenyl group; an aryl group having an alkyl group such as a 1-methyl-2-pyrenyl group, a 2-methylphenyl group, a 3-ethynylphenyl group, a 4-ethylphenyl group, a 4-(4'-tert-butylcyclohexyl)phenyl group, a 3-cyclohexylphenyl group, a 2-cyclohexylphenyl group, a 4-ethyl-1-naphthyl group, a 6-n-butyl-2-naphthyl group, and a 2,4-dimethylphenyl group; an aryl group having an alkoxy group or an aryloxy group such as a 4-methoxypheny group, a 3-ethoxyphenyl group, a 2-ethoxyphenyl group, a 4-n-propoxyphenyl group, a 3-n-propoxyphenyl group, a 4-isopropoxyphenyl group, a 3-isopropoxyphenyl group, a 2-isopropoxyphenyl group, a 2-sec-butoxyphenyl group, a 4-n-pentyloxyphenyl group, a 4-isopentyloxyphenyl group, a 2-methyl-5-methoxypheny group, and a 2-phenyloxyphenyl group; an aryl group having an aryl group such as a 4-phenylphenyl group, a 3-phenylphenyl group, a 2-phenylphenyl group, a 2,6-diphenylphenyl group, a 4-(2'-naphthyl)phenyl group, a 2-phenyl-1-naphthyl group, a 1-phenyl-2-naphthyl group, and a 7-phenyl-1-pyrenyl group; an aryl group having a halogen atom such as a 4-fluorophenyl group, a 3-fluorophenyl group, a 2-fluorophenyl group, a 4-chlorophenyl group, a 4-bromophenyl group, a 2-chloro-5-methylphenyl group, a 2-chloro-6-methylphenyl group, a 3,4-dichlorophenyl group, a 2-methyl-3-chlorophenyl group, a 2-methoxy-4-fluorophenyl group, and a 2-fluoro-4-methoxyphenyl group; and a 2-(trifluoromethyl)phenyl group, a 3-(trifluoromethyl)phenyl group, a 4-(trifluoromethyl)phenyl group, a 3,5-bis(trifluoromethyl)phenyl group, a 4-(perfluoroethyl)phenyl group, a 4-methylthiophenyl group, a 4-ethylthiophenyl group, a 4-cyanophenyl group, and a 3-cyanophenyl group.

Examples of the substituted or unsubstituted aralkyl group include an unsubstituted aralkyl group or an aralkyl group having an alkyl group such as a benzyl group, an α-methylbenzyl group, a phenethyl group, an α-methylphenethyl group, an α,α-dimethylbenzyl group, an α,α-dimethylphenethyl group, a 4-methylphenethyl group, a 4-methylbenzyl group, and a 4-isopropylbenzyl group; an aralkyl group having an aryl group or an aralkyl group such as a 4-benzylbenzyl group, a 4-phenethylbenzyl group, and a 4-phenylbenzyl group; an aralkyl group having a substituted oxy group such as a 4-methoxybenzyl group, a 4-n-tetradecyloxybenzyl group, a 4-n-heptadecyloxybenzyl group, a 3,4-dimethoxybenzyl group, a 4-methoxymethylbenzyl group, a 4-vinyloxymethylbenzyl group, 4-benzyloxybenzyl group, and a 4-phenethyloxybenzyl group; an aralkyl group having a hydroxy group such as a 4-hydroxybenzyl group and a 4-hydroxy-3-methoxybenzyl group; an aralkyl group having a halogen atom such as a 4-fluorobenzyl group, a 3-chlorobenzyl group, and a 3,4-dichlorobenzyl group; and a 2-furfuryl group, a diphenylmethyl group, a 1-naphthylmethyl group, and a 2-naphthylmethyl group.

The substituted or unsubstituted aryloxy group is an aryloxy group which may have the same substituent as in the case of the substituted aryl group as described above, and examples thereof include substituted or unsubstituted aryloxy groups derived from the substituents shown as specific examples of the substituted aryl group as described above.

The substituted or unsubstituted arylthio group is an arylthio group which may have the same substituent as in the case of the substituted aryl group as described above, and examples thereof include substituted or unsubstituted arylthio groups derived from the substituents shown as specific examples of the substituted aryl group as described above.

In general formula (2), when adjacent groups selected from R2 to R5 are combined with each other and thus, together with the carbon atoms to which they are attached, to form a substituted or unsubstituted 5 or more-membered ring, examples of the ring may include a benzene ring, a naphthalene ring, an anthracene ring, an indene ring, and a phenanthrene ring, preferably a benzene ring and a naphthalene ring.

Furthermore, examples of the substituent of the 5 or more-membered ring include a halogen atom, a substituted or unsubstituted alkyl group, a substituted or unsubstituted alkoxy group, a substituted or unsubstituted alkylthio group, a substituted or unsubstituted aryl group, and a substituted or unsubstituted aryloxy group.

Preferred are a halogen atom, a substituted or unsubstituted alkyl group having 1 to 10 carbon atoms, a substituted or unsubstituted alkoxy group having 1 to 10 carbon atoms, a substituted or unsubstituted alkylthio group having 1 to 10 carbon atoms, a substituted or unsubstituted aryl group having 6 to 18 carbon atoms, and a substituted or unsubstituted aryloxy group having 6 to 18 carbon atoms.

More preferred are a halogen atom, a substituted or unsubstituted alkyl group having 1 to 8 carbon atoms, and a substituted or unsubstituted alkoxy group having 1 to 4 carbon atoms.

Specific examples of these substituents include the same substituents as illustrated for R1 to R5 as described above, which is also applied to the preferred substituents among them.

Specific examples of component Q represented by formula (2) according to the present invention include the following compounds, but the present invention is not limited to these.

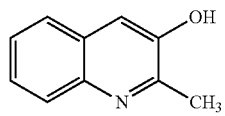

(2-1)

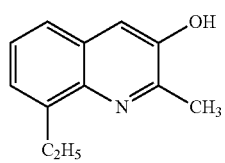

(2-2)

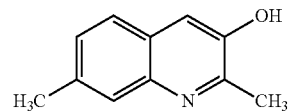

(2-3)

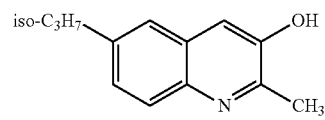

(2-4)

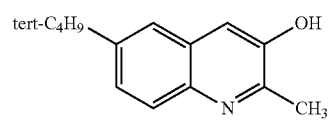

(2-5)

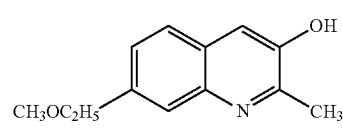

(2-6)

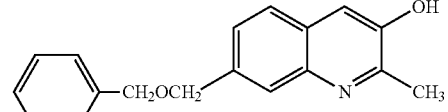

(2-7)

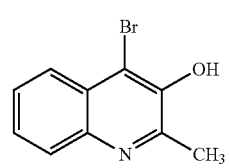

(2-8)

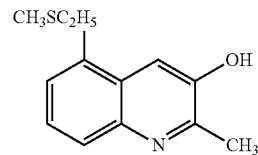

(2-9)

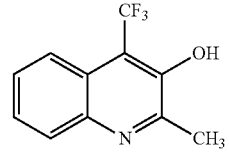

(2-10)

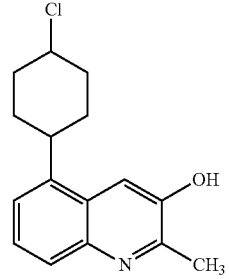

(2-11)

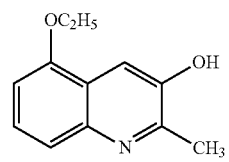

(2-12)

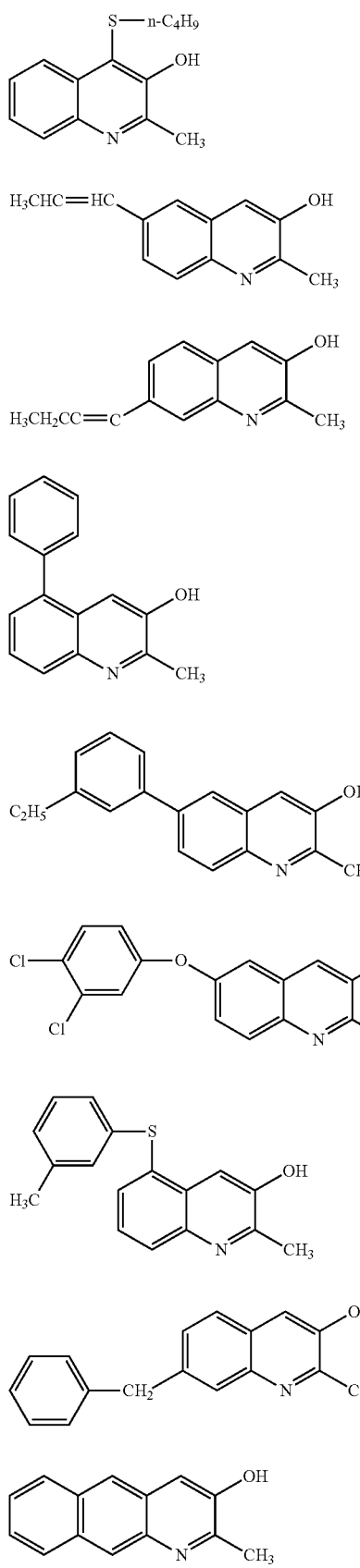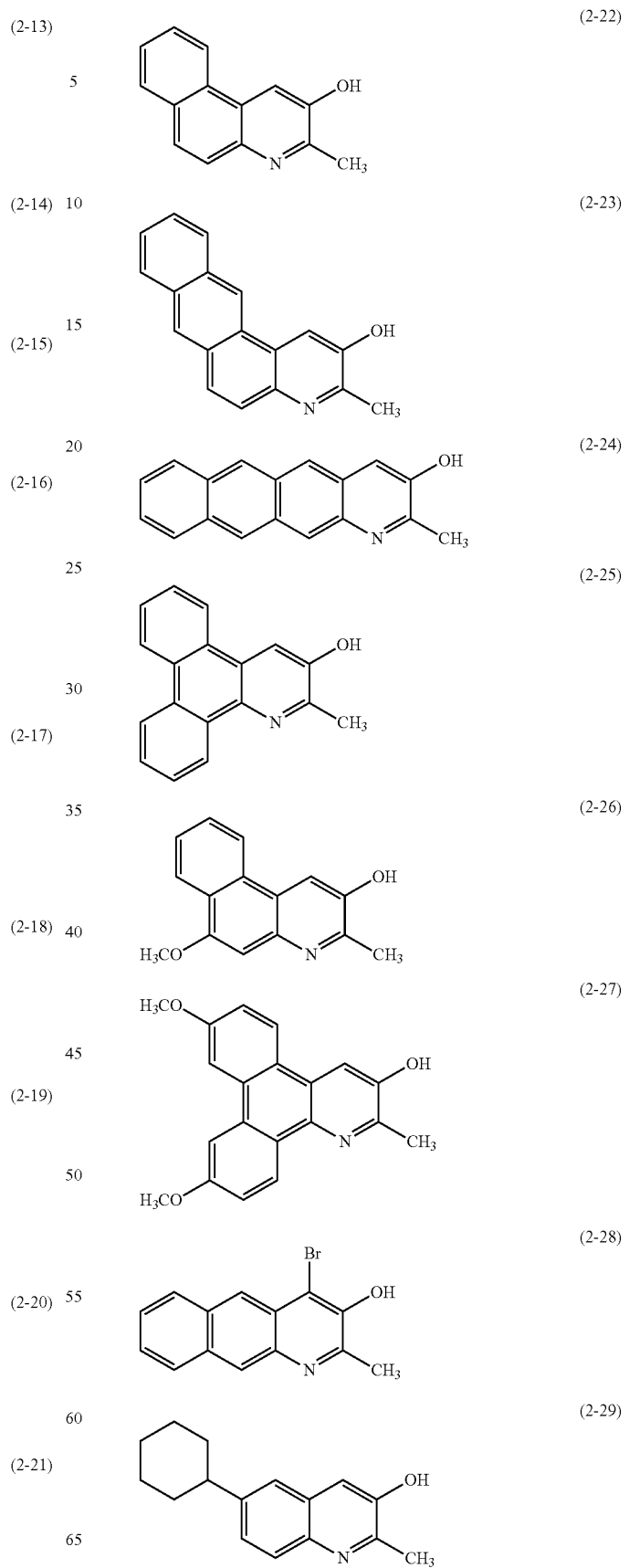

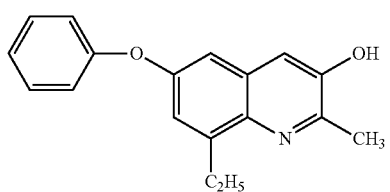
(2-30)
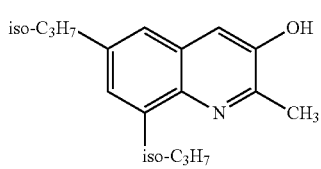
(2-31)
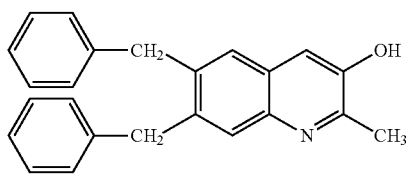
(2-32)
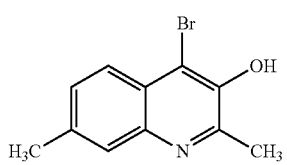
(2-33)
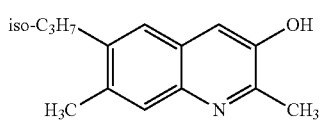
(2-34)
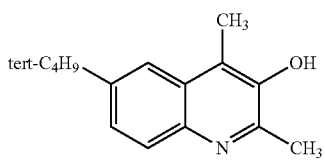
(2-35)
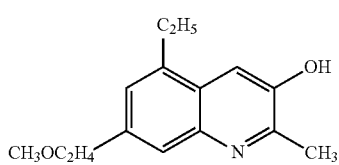
(2-36)
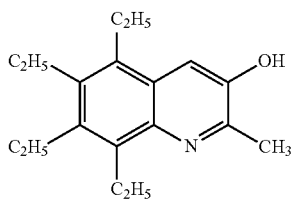
(2-37)
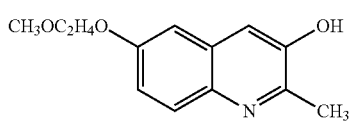
(2-38)
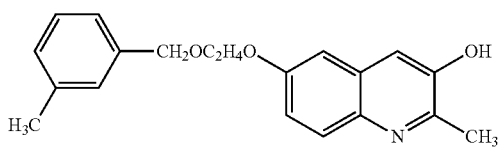
(2-39)
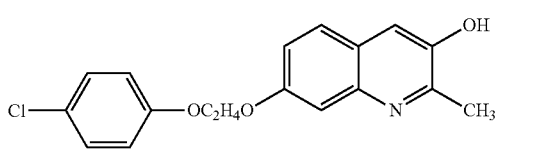
(2-40)
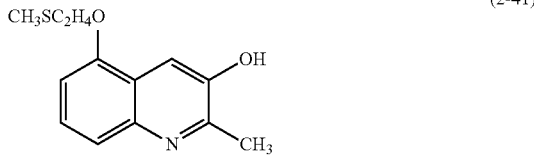
(2-41)
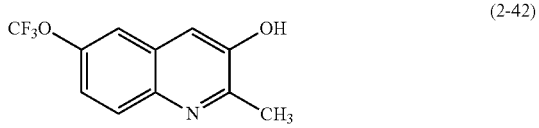
(2-42)
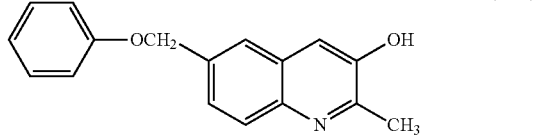
(2-43)
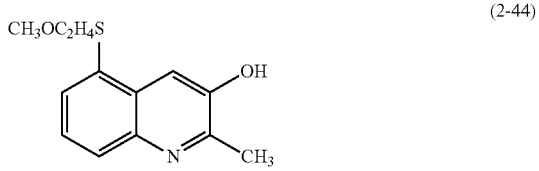
(2-44)
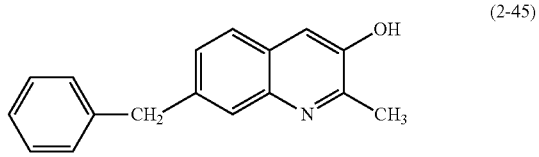
(2-45)
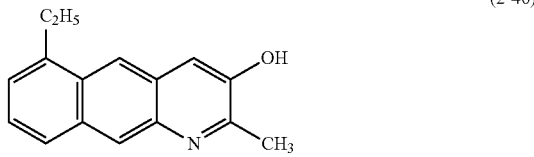
(2-46)
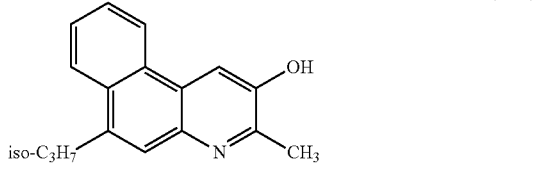
(2-47)

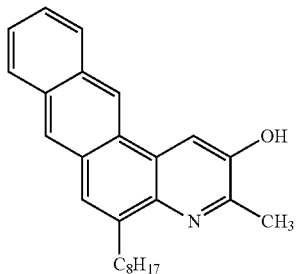
(2-48)
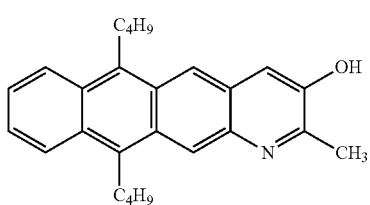
(2-49)
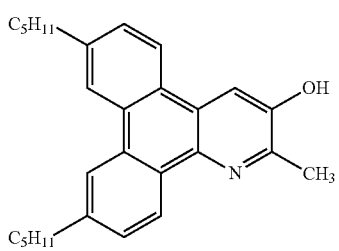
(2-50)
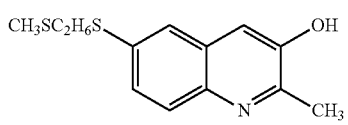
(2-51)
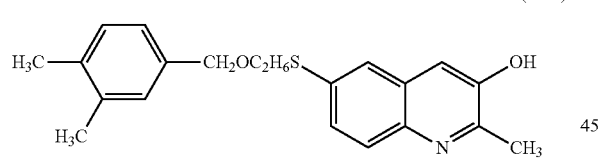
(2-52)
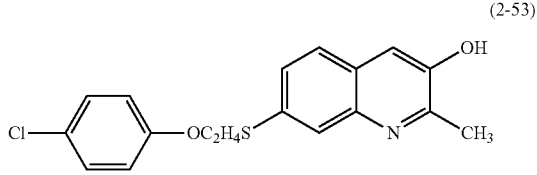
(2-53)
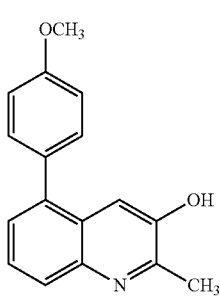
(2-54)
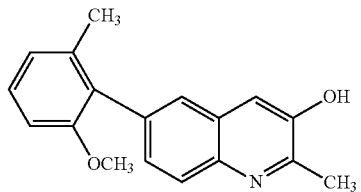
(2-55)
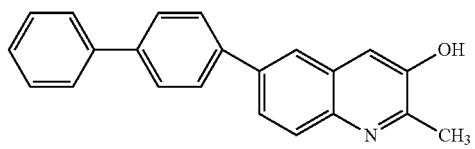
(2-56)
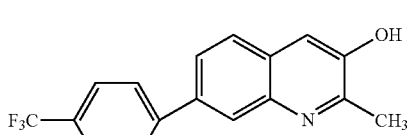
(2-57)
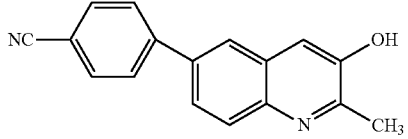
(2-58)
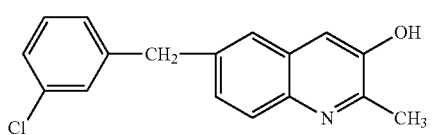
(2-59)
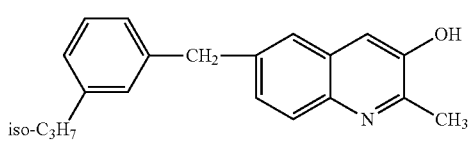
(2-60)
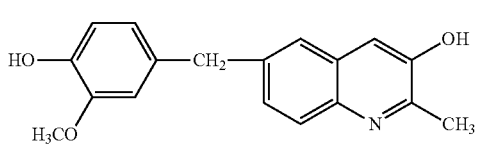
(2-61)
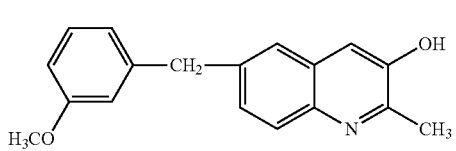
(2-62)
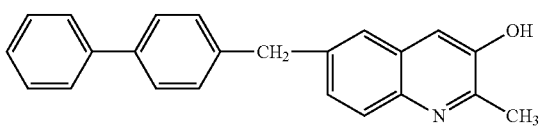
(2-63)

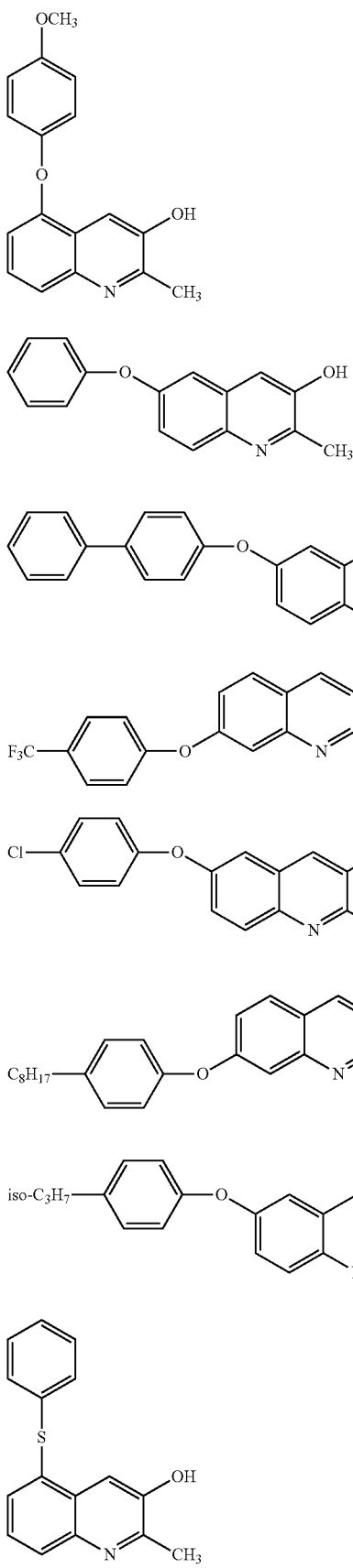
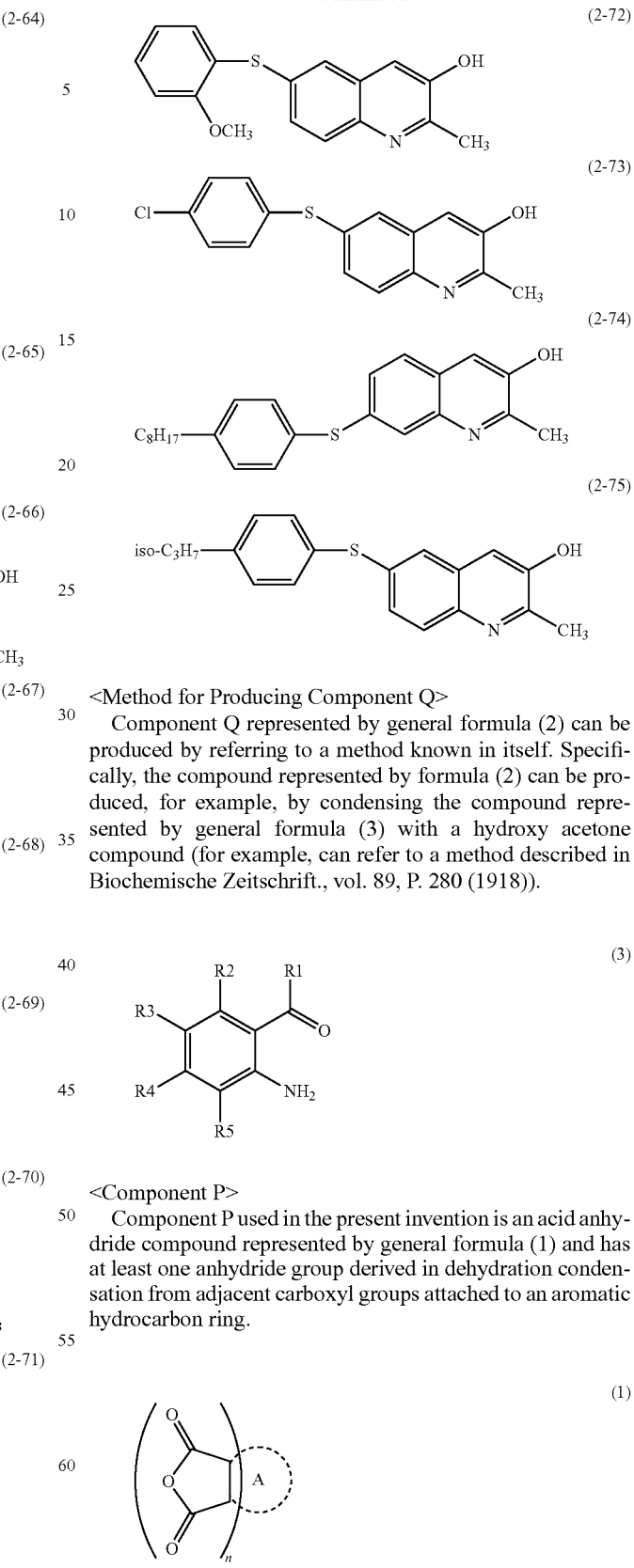

<Method for Producing Component Q>

Component Q represented by general formula (2) can be produced by referring to a method known in itself. Specifically, the compound represented by formula (2) can be produced, for example, by condensing the compound represented by general formula (3) with a hydroxy acetone compound (for example, can refer to a method described in Biochemische Zeitschrift., vol. 89, P. 280 (1918)).

<Component P>

Component P used in the present invention is an acid anhydride compound represented by general formula (1) and has at least one anhydride group derived in dehydration condensation from adjacent carboxyl groups attached to an aromatic hydrocarbon ring.

wherein ring A represents a substituted or unsubstituted aromatic hydrocarbon ring, and n represents an integer of 1 to 3.

Examples of the substituted or unsubstituted aromatic hydrocarbon ring which is ring A of general formula (1) include a substituted or unsubstituted benzene ring, a substituted or unsubstituted naphthalene ring, a substituted or unsubstituted anthracene ring, a substituted or unsubstituted phenanthrene ring, a substituted or unsubstituted fluorene ring, a substituted or unsubstituted acenaphthene ring, a substituted or unsubstituted indene ring, a substituted or unsubstituted pyrene ring, a substituted or unsubstituted perylene ring, a substituted or unsubstituted fluoranthene ring, and a substituted or unsubstituted anthraquinone ring.

Note that the substituents, which this ring may have, are the same as the illustrated substituents represented by R1 to R5 in general formula (2) as described above, and preferred embodiments thereof also are the same.

Specific examples of component P represented by formula (1) according to the present invention include the following compounds, but the present invention is not limited to these.

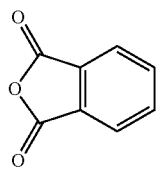
(1-1)

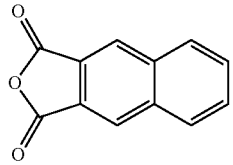
(1-2)

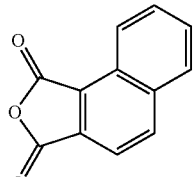
(1-3)

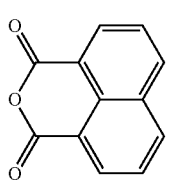
(1-4)

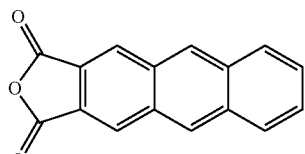
(1-5)

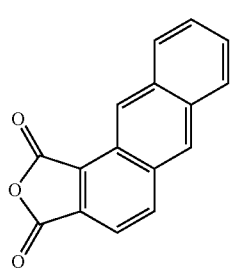
(1-6)

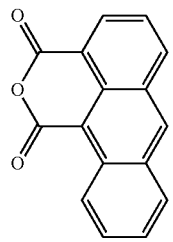
(1-7)

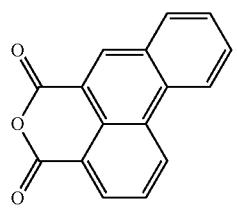
(1-8)

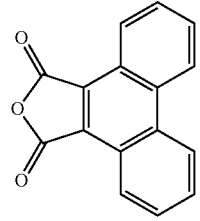
(1-9)

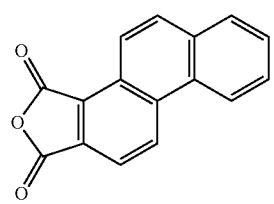
(1-10)

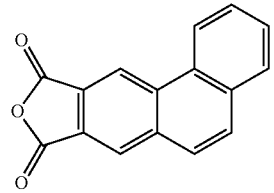
(1-11)

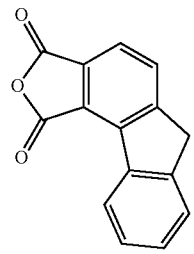
(1-12)

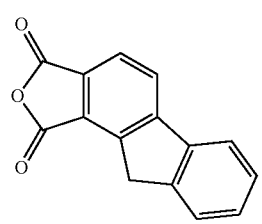
(1-13)

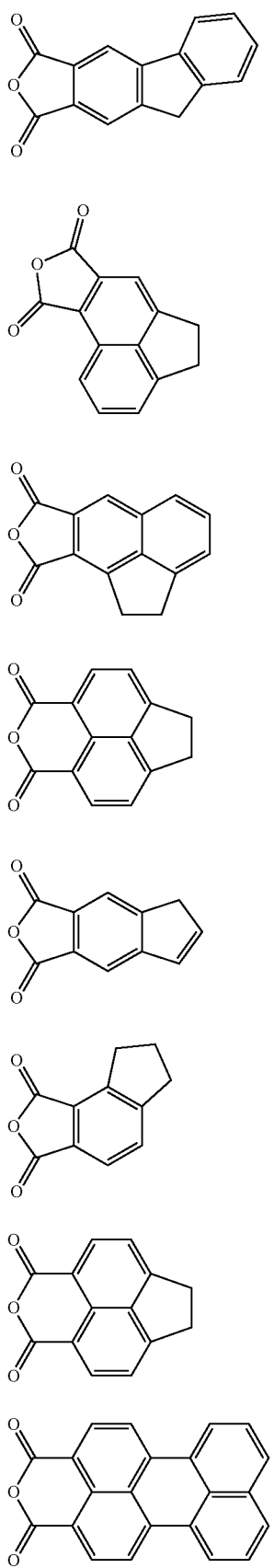
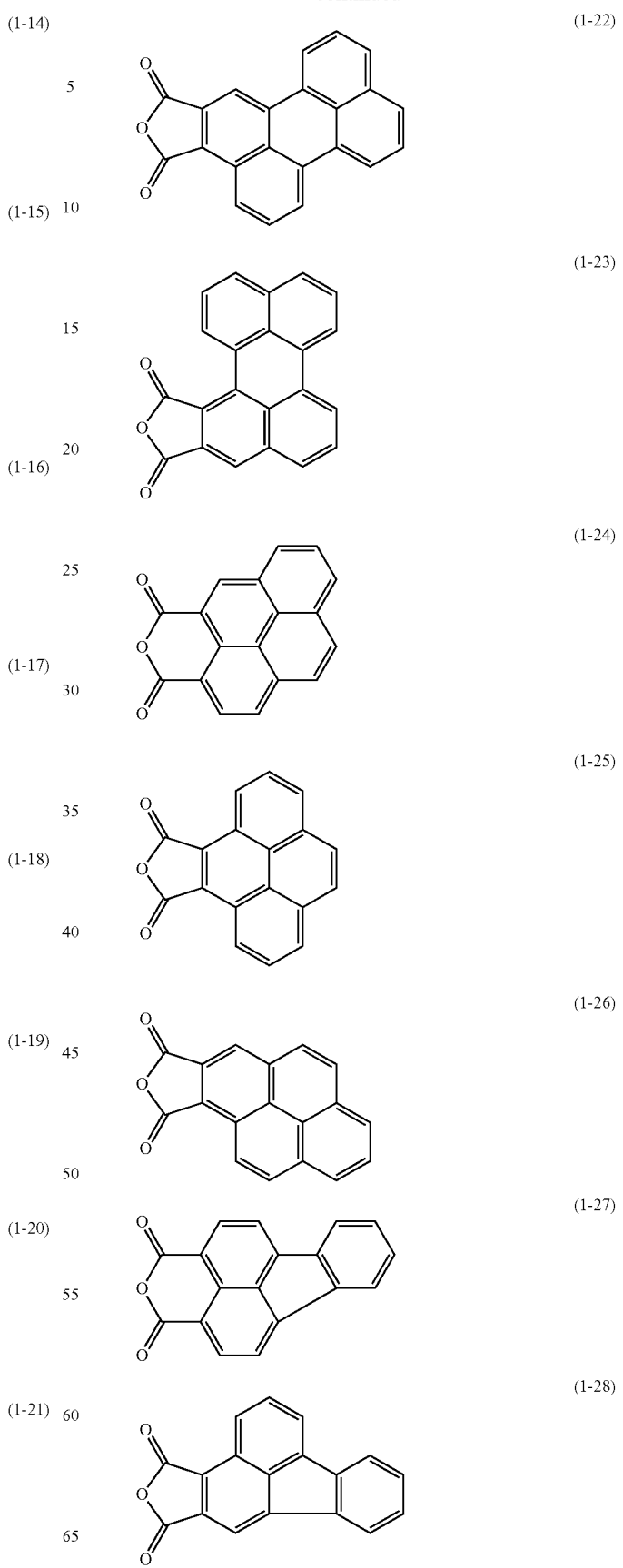

(1-29)
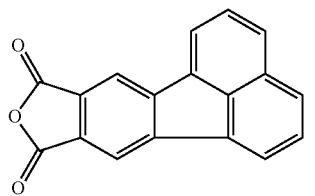
(1-30)
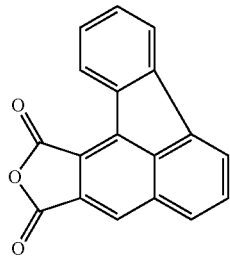
(1-31)
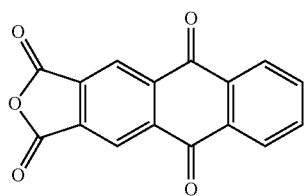
(1-32)
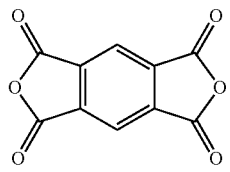
(1-33)
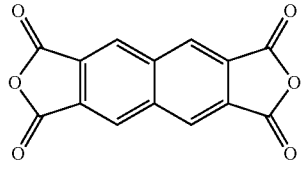
(1-34)
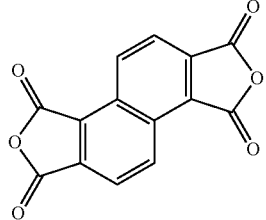
(1-35)
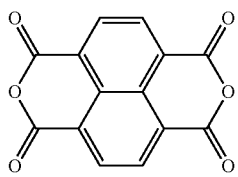
(1-36)
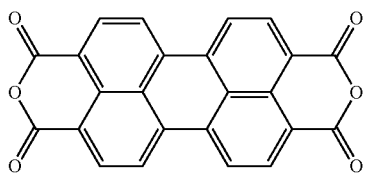
(1-37)
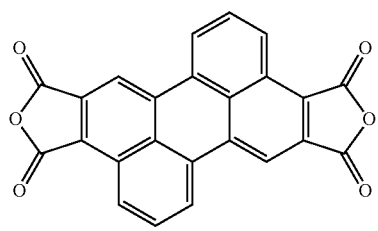
(1-38)
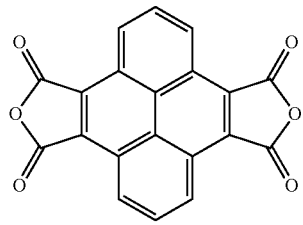
(1-39)
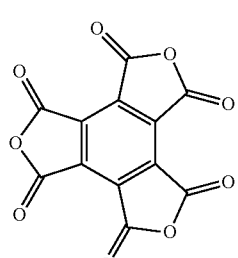
(1-40)
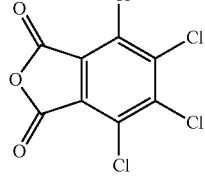
(1-41)
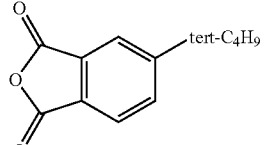
(1-42)
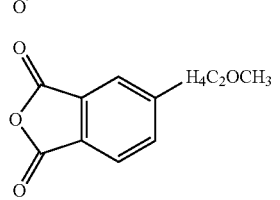
(1-43)
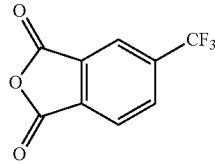
(1-44)
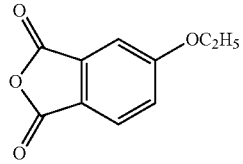

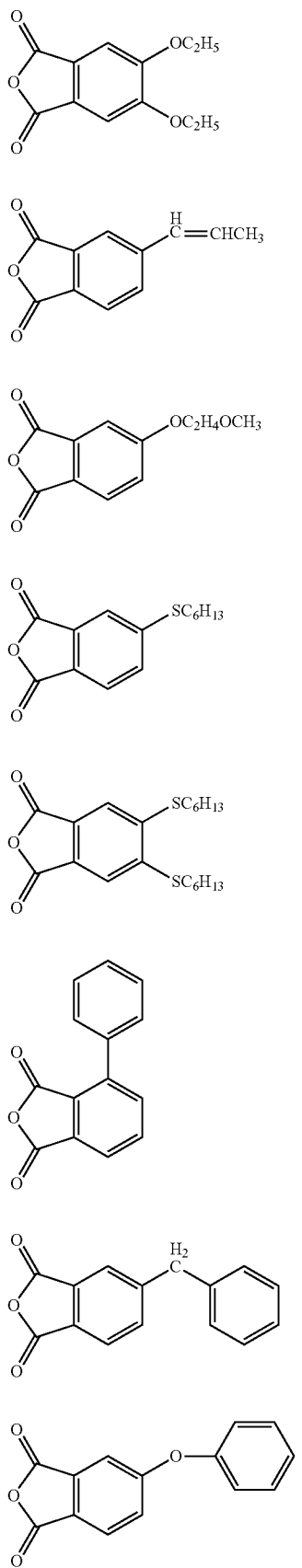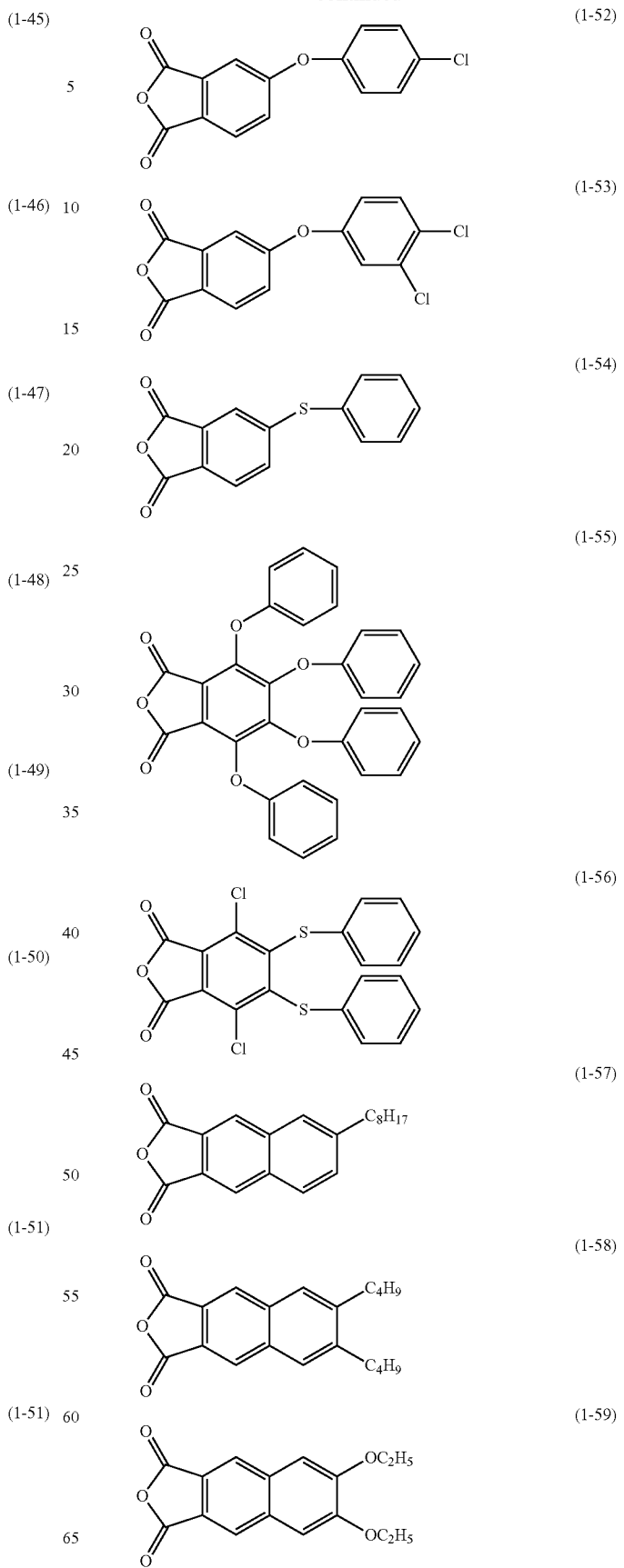

(1-60) 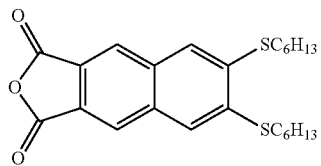
(1-61) 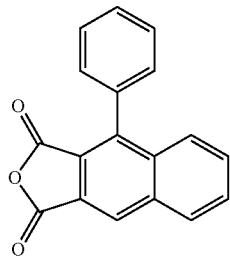
(1-62) 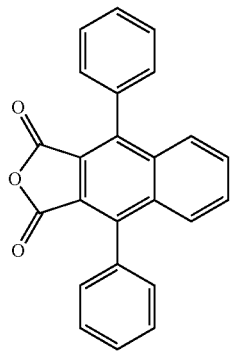
(1-63) 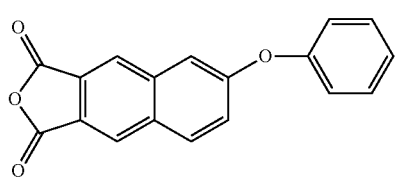
(1-64) 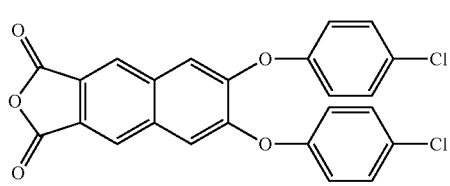
(1-65) 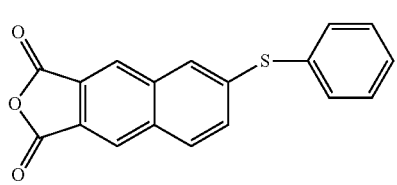
(1-66) 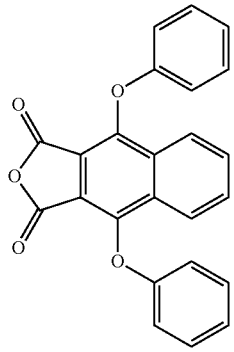
(1-67) 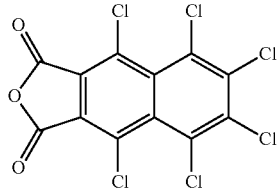
(1-68) 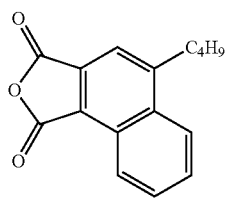
(1-69) 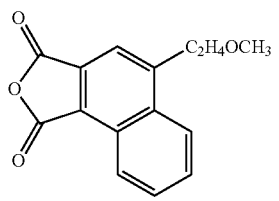
(1-70) 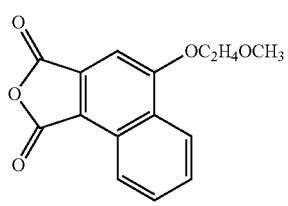
(1-71) 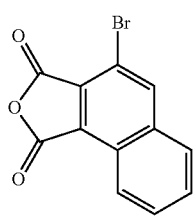
(1-72) 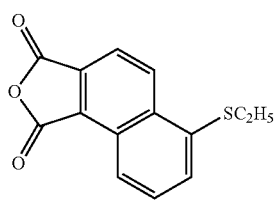

(1-73)
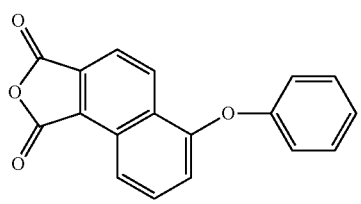
(1-74)
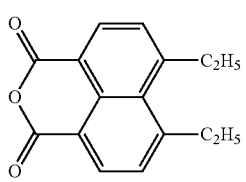
(1-75)
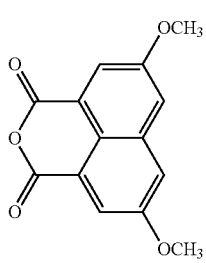
(1-76)
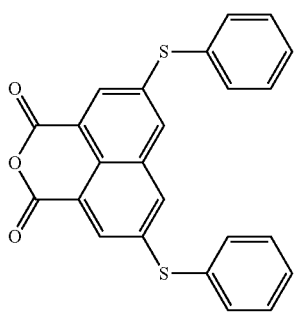
(1-77)
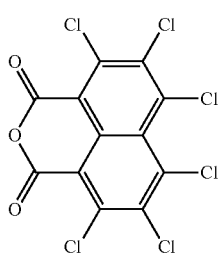
(1-78)
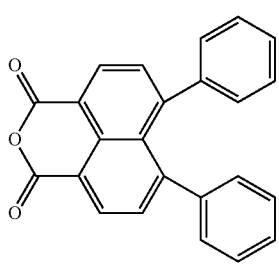
(1-79)
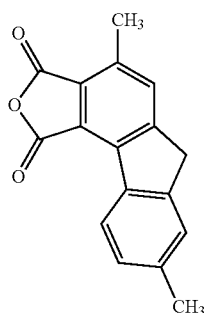
(1-80)
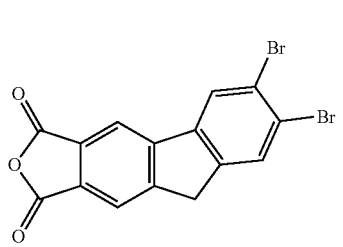
(1-81)
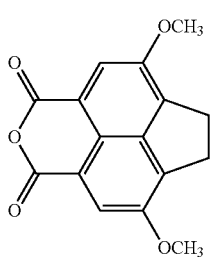
(1-82)
(1-83)
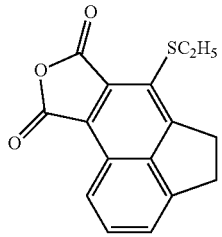
(1-84)
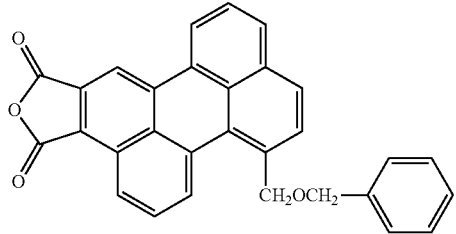

(1-85)
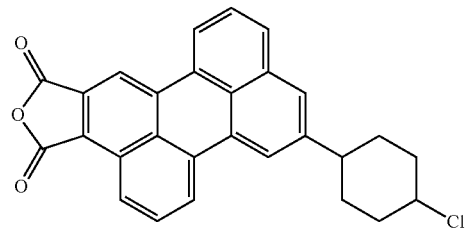
(1-86)
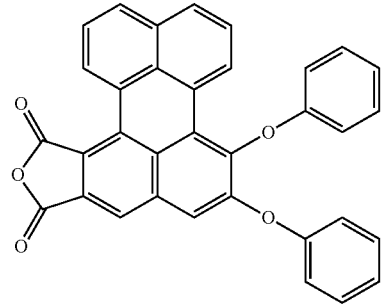
(1-87)
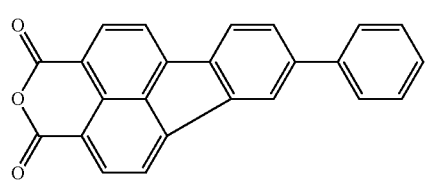
(1-88)
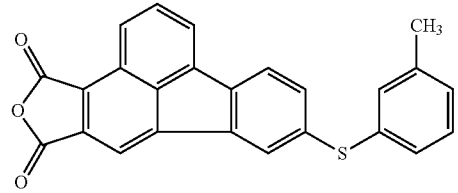
(1-89)
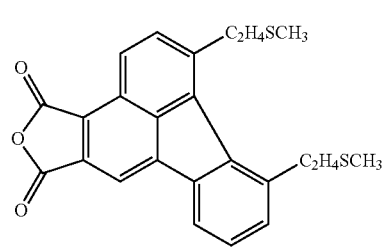
(1-90)
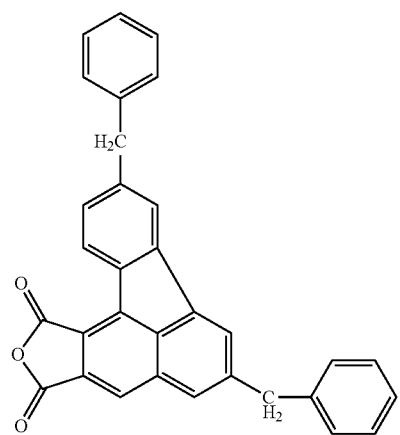
(1-91)
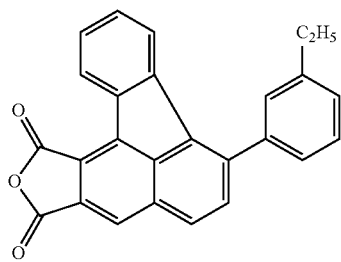
(1-92)
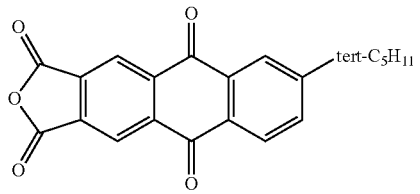
(1-93)
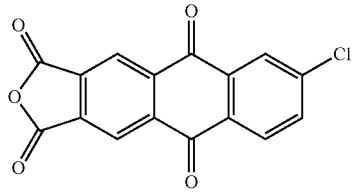
(1-94)
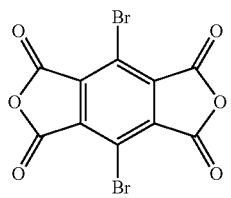
(1-95)
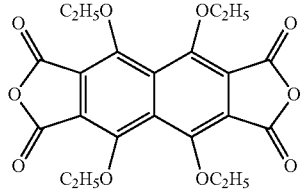
(1-96)
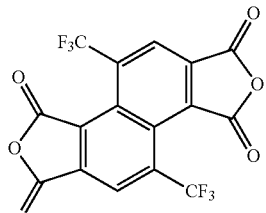
(1-97)
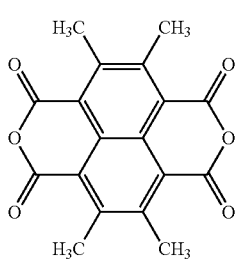

(1-98)

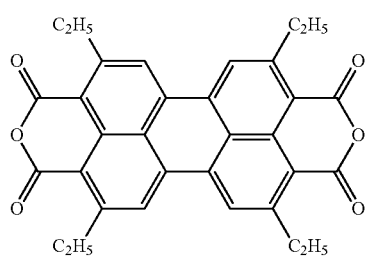

(1-99)

(1-100)

<Method for Producing Component P>

Component P represented by general formula (1) can be produced by referring to a method known in itself.

Specifically, the compound represented by formula (1) can be produced, for example, by subjecting a dicarboxylic acid compound represented by general formula (1-a) to dehydration ring closure, optionally using a dehydrator (for example, sulfuric acid) (for example, can refer to a method described in J. Am. Chem. Soc., 73, 1371 (1951)).

(1-a)

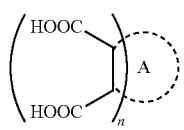

Furthermore, the compound represented by formula (1-4) can also be produced, for example, by oxidizing a methylene-substituted aromatic compound represented by formula (1-4-a) with sodium dichromate as an oxidizing agent (for example, can refer to a method described in J. Org. Chem., 25, 32 (1960)).

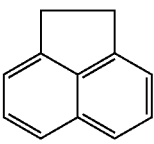 → 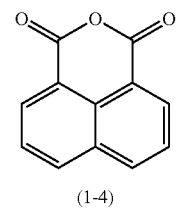

(1-4a)  (1-4)

<Heat-Sensitive Color-Developing Composition>

The heat-sensitive color-developing composition containing component Q and component P of the present invention will be described below.

The heat-sensitive color-developing composition of the present invention contains component Q and component P of the present invention as essential components, but it optionally contains other components such as a binder. The type and amount of other components are different depending on the state of the color-developing material to which the heat-sensitive color-developing composition is applied.

Component Q and component P of the present invention are preferably solid at normal temperature in the application of the heat-sensitive color-developing composition, but it is not essential conditions. Even if they are liquid at normal temperature, they can be applied by microencapsulation or other means. Furthermore, component Q and component P can be used independently or in combination of two or more thereof.

The composition ratio of component Q to component P is different depending on the state of the color-developing material to which the composition is applied, but, generally, the molar ratio of component Q to component P is preferably 1:0.1 to 1:10, more preferably 1:0.3 to 1:3.

Examples of the color-developing material include color-developing recording materials such as a heat-sensitive recording material, an electrosensitive recording material, and a laser beam recording material, and it is also possible to use the color-developing material in combination with other recording methods, for example, magnetic recording, metal thin film recording, and opaque recording.

In the case of a color-developing recording material, component Q and component P are respectively ground and dispersed into fine particles, followed by mixing both the fine particles, and thereto are optionally added a binder and other auxiliary agents to obtain a coating liquid, which is applied to a support such as paper, a synthetic paper, a film, and a plastic, followed by drying. A developed color body can be formed by giving thermal energy to the obtained color-developing recording material at a temperature in the range of 80 to 300° C. The developed color body can be formed in the whole recording layer or only in a desired place of the recording layer. If the heating temperature is lower than 80° C., it will take a long time to develop color, or the coloring density will be low, and if the temperature is higher than 300° C., the components Q and P tend to be decomposed more easily.

Any energy source that may be finally converted into thermal energy can be used as the thermal energy used in forming the developed color body, and examples thereof may include thermal energy such as a thermal head, a hot stamp, and a heat stylus and light energy such as a laser beam.

The obtained developed color body has various hues and shows high fastness to light, heat, humidity, a plasticizer, an oil, and the like. For example, when a heat-sensitive recording material is obtained by selecting paper or a plastic sheet as a support and carrying a recording layer containing the heat-sensitive color-developing composition of the present invention on the support, the developed color image of the resulting heat-sensitive recording material is extremely excellent in fastness.

The heat-sensitive color-developing composition of the present invention can also be dissolved or dispersed in a solvent to be used as an ink or a coating. Such a coating can be used to determine whether it has been subjected to heat treatment or not. For example, if some of cans, bottles or rubber in the production of canned or bottled food or production of rubber is coated with such a coating, what is heat-treated will turn vivid in hue in contrast to no color change in what is not treated. Thus, the heat treatment can be clearly recognized at a glance.

Furthermore, the heat-sensitive color-developing composition of the present invention may be given thermal energy to obtain a developed color body with a deep color and fastness, and the developed color body may be ground into an organic pigment. If paint is produced using this organic pigment, strong robust paint can be obtained.

<Heat-Sensitive Recording Material>

A heat-sensitive recording material containing the heat-sensitive color-developing composition of the present invention will be described below.

The heat-sensitive recording material comprises a support and a recording layer provided on the support, wherein the recording layer contains the heat-sensitive color-developing composition of the present invention and can embody a color-developed state by heat. As a support, paper, a synthetic paper, a synthetic resin film, a laminated paper, a nonwoven fabric sheet, or the like is used depending on the purpose.

Basically, the recording layer contains three components of component Q, component P, and a binder. First, two components, component Q and component P, are dispersed by an attritor or a sand mill, and thereto is added a binder to obtain a heat-sensitive coating liquid. At this time, two components, component Q and component P, may be collectively dispersed, or may be separately dispersed and then mixed. The thus obtained heat-sensitive coating liquid can be applied and dried on a support to thereby form a recording layer.

Note that the heat-sensitive coating liquid may be in a dispersion state in which the two components, component Q and component P, are contained as fine particles, or may be in a solution state in which the components are completely dissolved.

The molar ratio of component Q to component P, which are developed color precursors, is preferably 1:0.1 to 1:6, more preferably 1:0.4 to 1:3. Furthermore, the weight ratio of a mixture of the developed color precursors to a binder is preferably 1:1 to 1:0.01, more preferably 1:0.5 to 1:0.05.

In the recording layer, a melting point depression agent, an ultraviolet absorber, an antioxidant, an organic and an inorganic pigment, and the like can be added depending on the purpose.

Examples of the melting point depression agent include wax such as paraffin wax, polyethylene wax, and higher fatty acid and esters thereof, acid amides such as stearic acid amide, diphenyls such as 4,4'-dimethyl biphenyl, methylolamides, naphthalenes such as 1,3-dinitronaphthalene, ureas, acids such as phthalic anhydride, anilides such as acetanilide, benzanilide, and an alkyl carboxylic acid anilide, triphenyls, phthalonitriles, ethers such as bisresorcinol ethylene ether, salicylic acid derivatives such as 4-tert-butyl salicylate, ethyl-2-cyano-3,3-diphenyl acrylate, benzotriazoles, fluorene, dimethyl isophthalate, diphenylsulfone, mandelic acid, benzoin, ethylanthraquinone, cumarone compounds, carbazoles such as N-ethylcarbazole, sulfonamides, triphenylmethanes, thiazoles such as dibenzothiazyl disulfide, sulfenamides such as N-cyclohexyl-2-benzothiazolylsulfenamide, thiurams such as tetramethylthiuramdisulfide, dithioic acid salts such as zinc dibutyldithiocarbamate, guanidines such as diphenylguanidine, thioureas such as N,N-diphenylthiourea, phenyl hydrazide derivatives of carboxylic acids, p-hydroxy benzoate esters, and amides such as N,N-diphenylformamide.

Examples of the ultraviolet absorber include benzotriazole and derivatives thereof, benzoin and derivatives thereof, 2-chloro anthraquinone, benzoyl peroxide, salicylates such as p-tert-butylphenyl salicylate, and cyanoacrylates such as diphenylethyl acrylate.

Examples of the antioxidant include hindered phenols such as 2,6-di-tert-butyl-4-methylphenol, di(3-tert-butyl-4-hydroxy-5-methylphenyl)thioether, and 1,1-bis(2-methyl-4-hydroxy-5-tert-butylphenyl)butane and hindered amines such as di(2,2,6,6-tetramethyl-4-piperidine)sebacate.

Examples of the pigment include talc, clay, silica, calcined kaolin, zinc oxide, silicon oxide, titanium oxide, aluminum hydroxide, calcium carbonate, magnesium carbonate, and a urea-formalin resin.

Examples of the dispersion medium of the binder which can be used include water and organic solvents (such as toluene, methanol, ethanol, isopropyl alcohol, n-hexane, cyclohexane, n-octanol, ethylcyclohexane, and dioxane).

Examples of the binder which can be used when the dispersion medium is water include a polyvinyl alcohol resin, a methylcellulose resin, a hydroxyethyl cellulose resin, a carboxymethyl cellulose resin, a methyl vinyl ether/maleic anhydride copolymer resin, a polyacrylic resin, a polyvinyl pyrrolidone resin, an acrylamide resin, gelatin, and gum arabic.

Examples of the binder which can be used when the dispersion medium is an organic solvent include an alkyd resin, a vinyl chloride resin, a urethane resin, a xylene resin, a phenolic resin, a coumarone resin, a vinyltoluene resin, a terpene resin, a vinyltoluene/butadiene copolymer resin, a vinyltoluene/acrylate copolymer resin, a styrene/acrylate copolymer resin, and a vinyl/isobutyl ether copolymer resin.

Furthermore, a protective layer can be provided on the recording layer, and an undercoat layer can be provided under the recording layer.

A urethane resin, a polyolefin resin, a polyester resin, a vinyl resin, an epoxy resin, and an acrylic resin can be used for the protective layer.

An insulative fine hollow particle, calcined kaolin, an organic pigment, a thermally expandable microcapsule, and the like can be used for the undercoat layer in order to improve color developability.

EXAMPLES

Hereinafter, the present invention will be described in further detail with reference to Synthesis Examples and Examples, but the present invention is not limited to these.

Synthesis Example 1

Component Q: Production of Compound No. (2-4)

Component Q used in Examples 1 to 4 was synthesized by condensing 5-iso-propyl-2-aminobenzaldehyde represented by general formula (3) with hydroxy acetone according to the method described in Biochemische Zeitschrift., vol. 89, P. 280 (1918).

Synthesis Example 2

Production of Component Q

Compound No. (2-1), Compound No. (2-12), Compound No. (2-21), Compound No. (2-24), Compound No. (2-25), Compound No. (2-26), Compound No. (2-34), and Compound No. (2-37), which were used in Examples 5 to 20, were synthesized by condensing corresponding derivatives represented by general formula (3), respectively, with hydroxy acetone according to the method described in Biochemische Zeitschrift., vol. 89, P. 280 (1918).

Synthesis Example 3

Component P: Production of Compound No. (1-1)

Component P used in Example 1 was synthesized by subjecting phthalic acid to dehydration ring closure according to the method described in J. Am. Chem. Soc., 73, 1371 (1951).

Synthesis Example 4

Component P: Production of Compound No. (1-4)

Component P used in Example 2 was synthesized by oxidizing acenaphthene with sodium dichromate according to the method described in J. Org. Chem. 25, 32 (1960).

Synthesis Example 5

Component P: Production of Compound No. (1-7)

Component P used in Example 3 was synthesized by subjecting 1,10-anthracene carboxylic acid to dehydration ring closure according to the method described in J. Am. Chem. Soc., 73, 1371 (1951).

Synthesis Example 6

Component P: Production of Compound No. (1-35)

Component P used in Example 4 was synthesized by subjecting 1,4,5,8-naphthalene tetracarboxylic acid to dehydration ring closure according to the method described in J. Am. Chem. Soc., 73, 1371 (1951).

Synthesis Example 7

Production of Component P

Compound No. (1-1), Compound No. (1-2), Compound No. (1-3), Compound No. (1-9), Compound No. (1-20), Compound No. (1-21), Compound No. (1-24), Compound No. (1-29), Compound No. (1-32), Compound No. (1-36), Compound No. (1-38), Compound No. (1-39), Compound No. (1-81), Compound No. (1-89), Compound No. (1-97), and Compound No. (1-98), which were used in Examples 5 to 20, were synthesized by subjecting corresponding carboxylic acids, respectively, to dehydration ring closure according to the method described in J. Am. Chem. Soc., 73, 1371 (1951).

Example 1

Preparation of Heat-Sensitive Recording Material

A compound (5 g) represented by Compound No. (2-4), as component Q, and 5 g of a compound represented by Compound No. (1-1), as component P, were separately ground with a sand mill for 2 hours. Next, to the ground component Q and ground component P was added 1 g of "ALMATEX" (trade name: manufactured by Mitsui Chemicals, Inc.) as a binder, followed by through mixing to prepare a heat-sensitive color-developing composition. The heat-sensitive color-developing composition was applied to high-quality paper and dried so that the dry coating amount might be 6 g/m$^2$ to obtain a heat-sensitive recording material.

The obtained heat-sensitive recording material was brought into contact with an iron having a temperature of 130° C. for 3 seconds to obtain a developed color image on the whole surface. This developed color image was vivid yellow.

Note that the developed color image of the heat-sensitive recording material obtained above was measured and evaluated for the following items. The evaluation results are shown in Table 2.

(I) Density

Density was measured with Macbeth Densitometer (TR-254 type), and an OD value obtained by using an amber filter is shown.

(II) Fastness of Developed Color Image

The fastness was evaluated by the residual ratio shown by the following formula.

Residual ratio (%)=(Density of developed color image after test/Density of developed color image before test)×100

(II-1) Light Resistance Test

The developed color image was irradiated with an ultraviolet carbon arc (manufactured by Suga Test Instruments Co., Ltd.) for 24 hours. The light resistance was shown by the residual ratio after the test.

(II-2) Moisture Resistance Test

The developed color image was kept at a temperature of 60° C. and a relative humidity of 90% for 24 hours. The image density was then measured to determine the residual ratio.

(II-3) Plasticizer Stability Test

The developed color image was laminated with paper to which a capsule coating liquid containing dioctyl phthalate was applied, passed through a pressure roller, and then kept at 25° C. for a week. The image density was then measured to determine the residual ratio.

(II-4) Wrap Stability Test

The developed color image was brought into contact with Hi-Wrap (manufactured by Mitsui Chemicals, Inc.), and thereto was applied a load of 100 g/cm$^2$ and kept for 24 hours at 40° C. The image density was then measured to determine the residual ratio.

Example 2

Preparation of Heat-Sensitive Recording Material

The same operation as in Example 1 was performed except that 5 g of the compound represented by Compound No. (1-4) was used as component P instead of 5 g of the compound represented by Compound No. (1-1) in Example 1, obtaining a heat-sensitive recording material and a developed color image on the whole surface. The developed color image was vivid red.

The developed color image of the prepared heat-sensitive recording material was subjected to measurement and evaluation in the same manner as in Example 1, and the results are shown in Table 2.

Example 3

Preparation of Heat-Sensitive Recording Material

The same operation as in Example 1 was performed except that 5 g of the compound represented by Compound No. (1-7) was used as component P instead of 5 g of the compound represented by Compound No. (1-1) in Example 1, obtaining a heat-sensitive recording material and a developed color image on the whole surface. The developed color image was vivid purple.

The developed color image of the prepared heat-sensitive recording material was subjected to measurement and evaluation in the same manner as in Example 1, and the results are shown in Table 2.

Example 4

Preparation of Heat-Sensitive Recording Material

The same operation as in Example 1 was performed except that 2.5 g of the compound represented by Compound No. (1-35) was used as component P instead of 5 g of the compound represented by Compound No. (1-1) in Example 1, obtaining a heat-sensitive recording material and a developed color image on the whole surface. The developed color image was vivid dark blue.

The developed color image of the prepared heat-sensitive recording material was subjected to measurement and evaluation in the same manner as in Example 1, and the results are shown in Table 2.

Examples 5 to 20

Preparation of Heat-Sensitive Recording Material

The same operation as in Example 1 was performed using the compounds described in Table 1 instead of component P and component Q in Example 1 to form developed color bodies, respectively.

The developed color images of the prepared heat-sensitive recording materials were subjected to measurement and evaluation in the same manner as in Example 1, and the results are shown in Table 2.

Comparative Example 1

Preparation of Heat-Sensitive Recording Material

The same operation as in Example 1 was performed except that 2-anilino-3-methyl-6-di-n-butylamino fluoran was used instead of the compound represented by Compound No. (2-4) and bisphenol A was used instead of the compound represented by Compound No. (1-1), obtaining a heat-sensitive recording material and a developed color image on the whole surface. The developed color image was black.

The developed color image of the prepared heat-sensitive recording material was subjected to measurement and evaluation in the same manner as in Example 1, and the results are shown in Table 2.

TABLE 1

|  | Component Q | Component P |
|---|---|---|
| Example 5 | Compound No. (2-1) | Compound No. (1-1) |
| Example 6 | Compound No. (2-1) | Compound No. (1-2) |
| Example 7 | Compound No. (2-12) | Compound No. (1-3) |
| Example 8 | Compound No. (2-12) | Compound No. (1-9) |
| Example 9 | Compound No. (2-21) | Compound No. (1-81) |
| Example 10 | Compound No. (2-21) | Compound No. (1-20) |
| Example 11 | Compound No. (2-24) | Compound No. (1-21) |
| Example 12 | Compound No. (2-24) | Compound No. (1-24) |
| Example 13 | Compound No. (2-25) | Compound No. (1-29) |
| Example 14 | Compound No. (2-25) | Compound No. (1-89) |
| Example 15 | Compound No. (2-26) | Compound No. (1-32) |
| Example 16 | Compound No. (2-26) | Compound No. (1-36) |
| Example 17 | Compound No. (2-34) | Compound No. (1-38) |
| Example 18 | Compound No. (2-34) | Compound No. (1-97) |
| Example 19 | Compound No. (2-37) | Compound No. (1-98) |
| Example 20 | Compound No. (2-1) | Compound No. (1-39) |

TABLE 2

| | | | (II) Fastness of developed color image (% residual ratio) | | | |
|---|---|---|---|---|---|---|
| | Hue | (I) Density | (II-1) Light resistance | (II-2) Moisture resistance | (II-3) Plasticizer resistance | (II-4) Wrap resistance |
| Example | | | | | | |
| 1 | Yellow | 1.26 | 100 | 100 | 100 | |
| 2 | Red | 1.30 | 100 | 100 | 100 | 100 |
| 3 | Purple | 1.13 | 100 | 100 | 100 | 100 |
| 4 | Dark blue | 1.25 | 100 | 100 | 100 | 100 |
| 5 | Yellow | 1.27 | 100 | 100 | 100 | 100 |
| 6 | Orange | 1.31 | 100 | 100 | 100 | 100 |
| 7 | Orange | 1.31 | 100 | 100 | 100 | 100 |
| 8 | Purple | 1.23 | 100 | 100 | 100 | 100 |
| 9 | Red | 1.30 | 100 | 100 | 100 | 100 |
| 10 | Red | 1.25 | 100 | 100 | 100 | 100 |
| 11 | Blue | 1.15 | 100 | 100 | 100 | 100 |
| 12 | Blue | 1.24 | 100 | 100 | 100 | 100 |
| 13 | Blue | 1.23 | 100 | 100 | 100 | 100 |
| 14 | Blue | 1.16 | 100 | 100 | 100 | 100 |
| 15 | Orange | 1.32 | 100 | 100 | 100 | 100 |
| 16 | Blue | 1.24 | 100 | 100 | 100 | 100 |
| 17 | Blue | 1.14 | 100 | 100 | 100 | 100 |
| 18 | Blue | 1.18 | 100 | 100 | 100 | 100 |
| 19 | Blue | 1.31 | 100 | 100 | 100 | 100 |
| 20 | Red | 1.13 | 100 | 100 | 100 | 100 |
| Comparative Example 1 | Black | 1.41 | 11 | 84 | 92 | 15 |

As shown in Table 2, the heat-sensitive recording material comprising the heat-sensitive color-developing composition of the present invention is very useful, especially because it is excellent in the fastness of a developed color image.

Industrial Applicability

The present invention has made it possible to provide a heat-sensitive color-developing composition for forming a developed color body having high fastness and a vivid hue, and a heat-sensitive recording material comprising the composition.

The invention claimed is:

1. A heat-sensitive color-developing composition comprising a hydroxyquinoline compound having a methyl group and an acid anhydride compound represented by general formula (1):

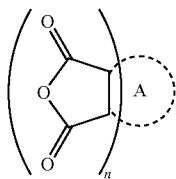

(1)

wherein ring A represents a substituted or unsubstituted aromatic hydrocarbon ring, and n represents an integer of 1 to 3.

2. The heat-sensitive color-developing composition according to claim 1, wherein the hydroxyquinoline compound having a methyl group is a compound represented by general formula (2):

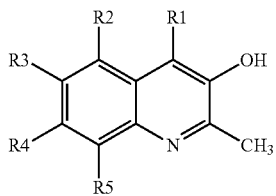

(2)

wherein $R1$ to $R5$ each independently represent a hydrogen atom, a halogen atom, a substituted or unsubstituted alkyl group, a substituted or unsubstituted alkoxy group, a substituted or unsubstituted alkylthio group, a substituted or unsubstituted alkenyl group, a substituted or unsubstituted alkynyl group, a substituted or unsubstituted aryl group, a substituted or unsubstituted aralkyl group, a substituted or unsubstituted aryloxy group, or a substituted or unsubstituted arylthio group;

or adjacent groups selected from $R2$ to $R5$ may be combined with each other and thus, together with the carbon atoms to which they are attached, to form a substituted or unsubstituted 5 or more-membered ring.

3. The heat-sensitive color-developing composition according to claim 1, wherein ring A in formula (1) is a substituted or unsubstituted benzene ring, a substituted or unsubstituted naphthalene ring, a substituted or unsubstituted anthracene ring, a substituted or unsubstituted phenanthrene ring, a substituted or unsubstituted fluorene ring, a substituted or unsubstituted acenaphthene ring, a substituted or unsubstituted indene ring, a substituted or unsubstituted pyrene ring, a substituted or unsubstituted perylene ring, a substituted or unsubstituted fluoranthene ring, or a substituted or unsubstituted anthraquinone ring.

4. The heat-sensitive color-developing composition according to claim 2, wherein in formula (2), $R1$ to $R5$ each independently represent a hydrogen atom, a halogen atom, a substituted or unsubstituted alkyl group having 1 to 20 carbon atoms, a substituted or unsubstituted alkoxy group having 1 to 20 carbon atoms, a substituted or unsubstituted alkylthio group having 1 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 30 carbon atoms, a substituted or unsubstituted aralkyl group having 7 to 30 carbon atoms, a substituted or unsubstituted aryloxy group having 3 to 30 carbon atoms, or a substituted or unsubstituted arylthio group having 3 to 30 carbon atoms;

or adjacent groups selected from $R2$ to $R5$ may be combined with each other and thus, together with the carbon atoms to which they are attached, to form an unsubstituted benzene or naphthalene ring, or a benzene or naphthalene ring having a substituent(s) which may each independently be a halogen atom, a substituted or unsubstituted alkyl group having 1 to 10 carbon atoms, a substituted or unsubstituted alkoxy group having 1 to 10 carbon atoms, a substituted or unsubstituted alkylthio group having 1 to 10 carbon atoms, a substituted or unsubstituted aryl group having 6 to 18 carbon atoms, or a substituted or unsubstituted aryloxy group having 6 to 18 carbon atoms.

5. The heat-sensitive color-developing composition according to claim 1, wherein ring A in formula (1) is a benzene ring, a naphthalene ring, an anthracene ring, a phenanthrene ring, a fluorene ring, an acenaphthene ring, an indene ring, a pyrene ring, a perylene ring, a fluoranthene ring, or an anthraquinone ring, which is unsubstituted; or a benzene ring, a naphthalene ring, an anthracene ring, a phenanthrene ring, a fluorene ring, an acenaphthene ring, an indene ring, a pyrene ring, a perylene ring, a fluoranthene ring, or an anthraquinone ring, having a substituent(s) which may each independently be a halogen atom, a substituted or unsubstituted alkyl group having 1 to 20 carbon atoms, a substituted or unsubstituted alkoxy group having 1 to 20 carbon atoms, a substituted or unsubstituted alkylthio group having 1 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 30 carbon atoms, a substituted or unsubstituted aralkyl group having 7 to 30 carbon atoms, a substituted or unsubstituted aryloxy group having 3 to 30 carbon atoms, or a substituted or unsubstituted arylthio group having 3 to 30 carbon atoms.

6. A heat-sensitive recording material comprising a support and a recording layer borne on the support, the recording layer comprising a heat-sensitive color-developing composition according to any one of claims 1 to 5.

* * * * *